Figure 2:
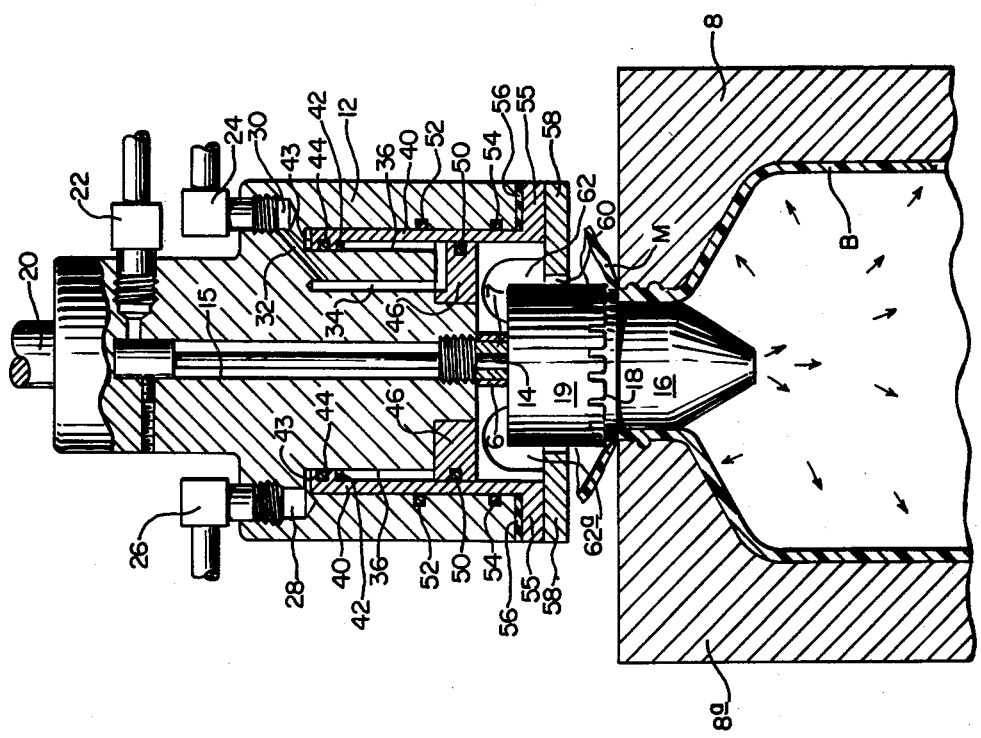

United States Patent [19]

Bradbury

[11] 4,173,447
[45] Nov. 6, 1979

[54] APPARATUS FOR CONTACT COOLING THE NECK MOIL OF BLOWN HOLLOW CONTAINERS

[75] Inventor: John R. Bradbury, Kansas City, Mo.

[73] Assignee: Ethyl Development Corporation, Baton Rouge, La.

[21] Appl. No.: 939,284

[22] Filed: Sep. 5, 1978

[51] Int. Cl.² .................... B29C 17/07; B29C 17/12
[52] U.S. Cl. .................................. 425/526; 264/533; 264/536; 425/527; 425/535
[58] Field of Search ............... 425/525, 526, 527, 535, 425/806 R, 806 A; 264/520, 533, 536

[56] References Cited

U.S. PATENT DOCUMENTS

| | | | |
|---|---|---|---|
| 3,075,239 | 1/1963 | Strong | 425/535 X |
| 3,339,229 | 9/1967 | Billings | 425/527 X |
| 3,657,406 | 4/1972 | Delebarre | 425/527 X |
| 3,819,317 | 6/1974 | Higginbotham | 425/535 X |
| 3,907,475 | 9/1975 | Bowers | 425/535 X |

Primary Examiner—Jan H. Silbaugh
Attorney, Agent, or Firm—Donald L. Johnson; John F. Sieberth; Edgar E. Spielman, Jr.

[57] ABSTRACT

An apparatus for cooling the neck moil of a blown container so that such moil can be easily removed from the container is disclosed. The apparatus has a main body portion which is connected to the rod of a blow pin cylinder so that the apparatus can be moved towards and away from the blow mold. The main body portion also has attached thereto the blow pin, a cutting collar and a rotation collar. To feed blow air to the blow pin, the main body portion provides an air channel. An annular cylinder is formed in the body portion which cylinder accepts an annular piston which piston has a cooling plate connected thereto. The cooling plate is designed to contact and flatten the moil against the cold blow mold so that the moil is cooled. By feeding compressed air to the cylinder at its upper end, the cooling plate is moved to contact the moil and by feeding compressed air to the cylinder bottom the cooling plate is retracted from the moil. In operation the apparatus along with the blow pin and the two cutting collars are lowered by the blow pin cylinder so that the blow pin enters into the extruded tube. The cutting collar pinches the moil at its juncture with the container neck while the rotation collar engages the moil. The tube is blown to the shape of the mold and the cooling plate presses down onto the hot moil and flattens it into a doughnut-like disk against the cold mold. The cooling plate moves upward away from the cooled moil and the blow pin along with the apparatus and collars are retracted away from the mold carrying with them the cooled, flattened moil. The cooled moil is then knocked from the rotation collar by a second downward motion of the cooling plate. The cooling plate returns to its uppermost position and the cycle is repeated.

8 Claims, 6 Drawing Figures

APPARATUS FOR CONTACT COOLING THE NECK MOIL OF BLOWN HOLLOW CONTAINERS

BACKGROUND OF THE INVENTION

Hollow plastic containers have long been produced by the blowing of an extruded tube captured between two mold halves. The captured, extruded tube will have a portion which extends out of the blow mold adjacent to the neck portion of the mold. When the blow pin is lowered through the neck portion of the mold into the extruded tube, the outside portion of the extruded tube is pinched between a cutter collar mounted above the blow pin and an anvil formed by the blow mold halves. This pinched-off portion is generally referred to as the neck moil. Blow air is introduced through the blow pin to inflate the captured tube to the shape of the mold halves. Cooling fluid is then passed through internal traces in the mold halves thereby cooling the blown container to insure that it is rigid enough to remove from the mold. The neck moil is not cooled and remains fairly soft and plastic. This moil must be removed from the completed container so that a commercially acceptable product is produced. Removal is conventionally achieved by engaging a rotation collar which fits about the cutter collar, with the moil so that the moil can be tightly gripped and rotated to shear it from the container. Since the pinching action between the cutter collar and the anvil does not always completely sever the moil from the container, oftentimes there is difficulty in effecting moil removal as the moil is not rigid enough to break cleanly from the container neck. Instead the soft moil is merely stretched and not removed resulting in a non-marketable bottle.

Therefore it is an object of this invention to provide a method and apparatus which is capable of separating a moil from a blown container without the risk of the container being ruined by faulty neck moil removal.

THE INVENTION

This invention relates to an apparatus for cooling the neck moil of a blown container while the container is in a blow mold which comprises: a body portion having a first connecting means for connecting it to the rod of a blow pin cylinder and a second connecting means for connecting it to a cutting collar, a rotation collar and a blow pin; a blow air channel in the body portion for providing pressurized gas to the blow pin; an annular cylinder in the body portion; an annular piston fittable within the annular cylinder having attached thereto a cooling plate which is positioned adjacent the cutting collar, the rotation collar and the blow pin so that the plate can contact and press the moil onto the blow mold; a first inlet means communicative with the annular cylinder for supplying pressurized gas to move the piston towards the moil; and a second inlet means communicative with the annular cylinder for supplying pressurized gas to move the piston away from the moil.

In operation the rod of the blow pin cylinder to which the apparatus of this invention is attached, is lowered so that the blow pin enters into the extruded tube captured between the blow mold halves. The cutting collar engages the moil pressing it against the blow mold anvil. The rotation collar likewise engages the moil to obtain a tight grip thereon. Blow air is blown through the blow air channel in the body portion of the apparatus to provide blow air to the blow pin which air inflates the tube captured within the mold. Preferably at the same time that the blow air is being supplied, the cooling plate is lowered to press the moil onto the cool blow mold. The blow mold is maintained in a cool state so that when the tube is blown and makes contact therewith it will be rigidified as quickly as possible. Additional cooling of the blow mold generally occurs after the blow air has been first introduced and this additional cooling will aid in further cooling of the moil now that it is in contact with the blow mold. After the container has been blown, the apparatus of this invention is rotated causing the rotation collar to rotate and apply the rotation forces to the cool pressed moil. This rotation serves to break the moil from the container. Generally speaking, a rotation of 10 to 15 degrees is sufficient to accomplish this breaking. Since the moil is cooled to rigidity by the apparatus of this invention, a clean break from the container upon rotation is assured.

Figure 6:
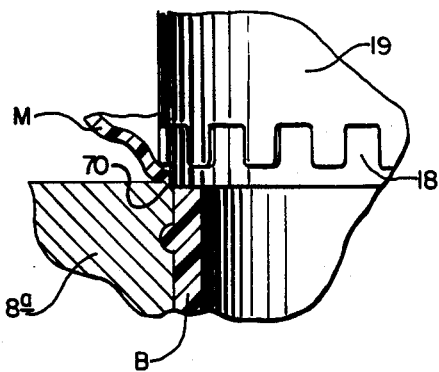

These and other features of the present invention contributing satisfaction in use and economy in manufacture will be more fully understood when taken in connection with the following description of a preferred embodiment and the accompanying drawings in which identical numerals refer to identical parts and in which:

FIGS. 1–5 are partial, vertical sectional views of an apparatus of this invention shown in different operating positions in combination with a split blow mold; and FIG. 6 is an enlarged view showing the relationship between the cutting collar and the blow mold anvil.

Figure 4:
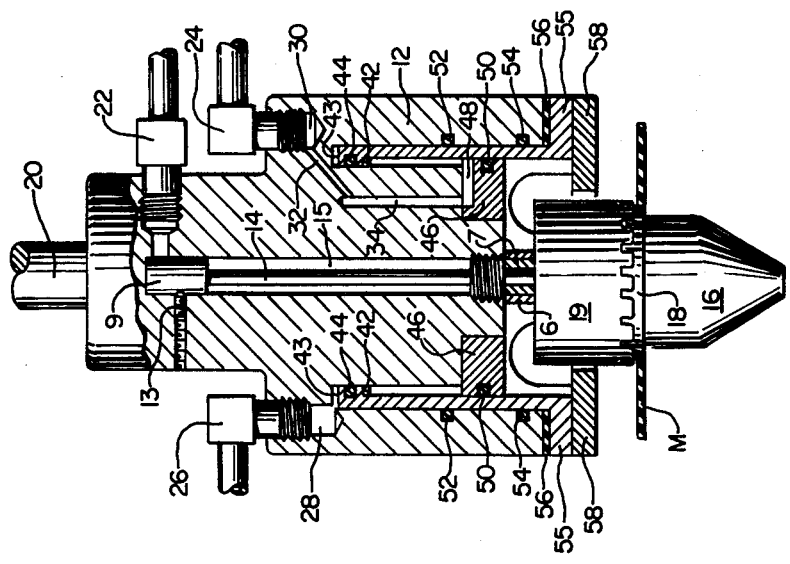
Figure 4:
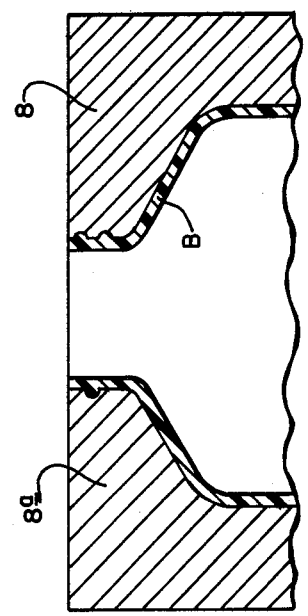
Figure 3:
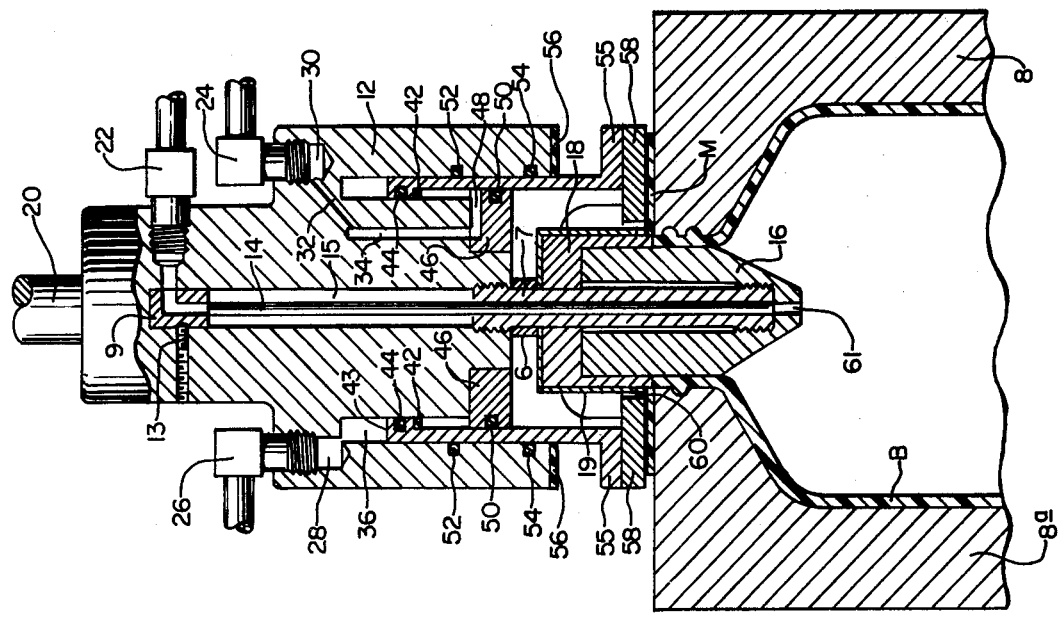

Referring now to FIGS. 1–5, there is shown an apparatus of this invention, generally designated by the numeral 10, in accompanyment with blow mold halves 8 annd 8a which have positioned therewith extruded tube "T." In FIGS. 2, 3 and 4, extruded tube "T" is blown to form bottle "B." Apparatus 10 is attached to the rod end of a conventional blow cylinder, which is not shown. The blow cylinder will act to raise and lower apparatus 10 along with cutting collar 18, rotation collar 19 and blow pin 16.

Apparatus 10 has a body 12 which is cylindrical in shape. Along the center axis of body 12 there is provided axial bore 15 for providing passageway for blow air to blow pin 16. Axial bore 15 has at its lowermost end a helical thread for receipt of blow pin stem 7. Positioned within axial bore 15 is blow air tube 14 which extends from fitting 22 to blow pin 16. The space between axial bore 15 and blow air tube 14 can be utilized for the passage of cooling fluid to blow pin 16. An alternative to utilizing blow air tube 14 would be to use axial bore 15 by itself to bring the blow air to the blow air pin. Of course, blow air pin 16 would need simple modification to insure an air-tight passage of the blow air to its tip. At the uppermost extent of blow air tube 14 there is provided casing 9 which can be silver soldered to blow air tube 14 to rigidly attach one to the other. This casing is utilized in conjunction with set screw 13 to maintain blow air tube 14 in position. Blow pin stem 7, immediately below its connection with body 12, has a portion which is rectangular in cross-section. By having a rectangular cross-section blow pin stem 7 can accept cutting collar 18 and rotation collar 19 through rectangular holes cut into the tops of these collars thereby assuring that the collars cannot rotate with respect to body 12. At the lowermost extent of blow pin stem 7 there is provided helical threads upon which blow pin 16 can be screwed. Thus when collars 18 and 19 have been inserted upon blow pin stem 7 and blow pin 16 has been tightened on the stem to urge the collars against spacer 6, a rigid relationship is insured between the collars and the blow pin. Blow pin stem 7 is also hollow so that blow air tube 14 can pass through the interior thereof to communicate blow air to the blow pin port 61.

Body 12 also provides an annular cylinder 36 which is dimensioned to receive annular piston 40. Annular piston 40 is dimensioned so that it nests within cylinder 36. Piston 40 will have an outside diameter closely approximating the outside diameter of cylinder 36 and an inside diameter larger than the inside diameter of annular cylinder 36. By having the inside diameter of the piston larger than the inside diameter of the cylinder there is provided cylinder space which facilitates introduction of compressed air into the cylinder to raise and lower the piston. From the drawings it can be seen that annular piston 40 has an out-turned flange 55 on one of its ends which flange is utilized to carry cooling plate 58 which is hereinafter described. At the other end of annular piston 40 is an inturned leg which forms a piston head 43. Piston head 43 is grooved to receive a pair of sealing rings 42 and 44 for the purposes hereinafter described.

Annular cylinder 36 is in communication with chamber 28 at its upper end so that compressed air can act upon the top of piston head 43 to cause annular piston 40 to move in a downward direction. Chamber 28 has at its upper end a compressed air fitting 26 which screws by way of conventional threads to body 12 as is shown in the drawings. An air hose attaches to the fitting and a compressed air source at the other end. The compressed air source is not shown in the drawings, it being understood that the compressed air can be provided by any conventional means.

To provide upward movement for annular piston 40 there is provided a compressed air conduit which is made up of horizontal bore 48, vertical bore 34 and feeder bore 32. Feeder bore 32 is in communication with chamber 30 which is in communication with compressed air fitting 24 which screws to body 12 as is shown in the drawings. A compressed air source is provided for this fitting the same as for fitting 26. Horizontal bore 48 communicates with the lowermost end of annular cylinder 36 so that compressed air can act against the bottom of piston head 43 to raise piston 40 when desired. To provide ease in forming vertical bore 34 and horizontal bore 48 there is provided annular ring 46 which bolts to body 12. As can be appreciated, when forming vertical bore 34 annular ring 46 is not in position and conventional drilling can be used to provide for vertical bore 34. Provision for horizontal bore 48 is made by providing a radial cut on the upper surface of annular ring 46 as can be seen in the drawings.

To provide as tight a seal as possible between annular cylinder 36 and annular piston 40 there is provided a plurality of sealing rings. Two of these rings, sealing ring 42 and 44, are attached to piston head 43 of annular piston 40 thereby providing an air-tight fit at that point between the cylinder and the piston. Annular ring 52 which fits within an annular cut made into body 12 and sealing ring 54 which is beneath sealing ring 52 and which also fits within an annular cut made into cylinder body 12 additionally aid in insuring that the cylinder space between annular piston 40 and annular cylinder 36 remains air-tight. Annular sealing ring 50 fitted into an annular cut on annular ring 46 seals the bottom end of annular cylinder 36.

Cooling plate 58, as before said, attaches to annular piston 40 at annular flange 55. The cooling plate is preferably in the shape of an annular ring which surrounds collars 18 and 19 and blow pin 16. The bore 60 of the annular ring is of a size to allow for free movement of cooling plate 58 as it moves axially with respect to the collars and blow pin. Other shapes for cooling plate 58 are permissible as long as the design permits pressing of the moil onto the cool blow mold. Generally speaking, it has been found preferable that cooling plate 58 be made of a material such as aluminum, having a thickness of from about $\frac{1}{8}$ to about $\frac{1}{2}$ inches. By utilizing a material such as aluminum some heat transfer can occur quite rapidly between the plate itself and the moil. This heat transfer in addition to the heat transfer between the moil and the cool blow mold will shorten the total heat transfer time.

To aid in the cooling of cooling plate 58, after it has contacted the hot moil, there can be porvided in the walls of annular piston 40 heat escape ports such as ports 62 and 62a shown in the drawings. It is to be understood that even though only two heat ports are shown, an equal number of heat ports additionally exist on that side of the piston not shown in the sectional views.

A polyurethane annular disk 56 prevents cooling plate 58 from making sharp impact with the body portion 12. Other cushioning material may be used.

Figure 1:
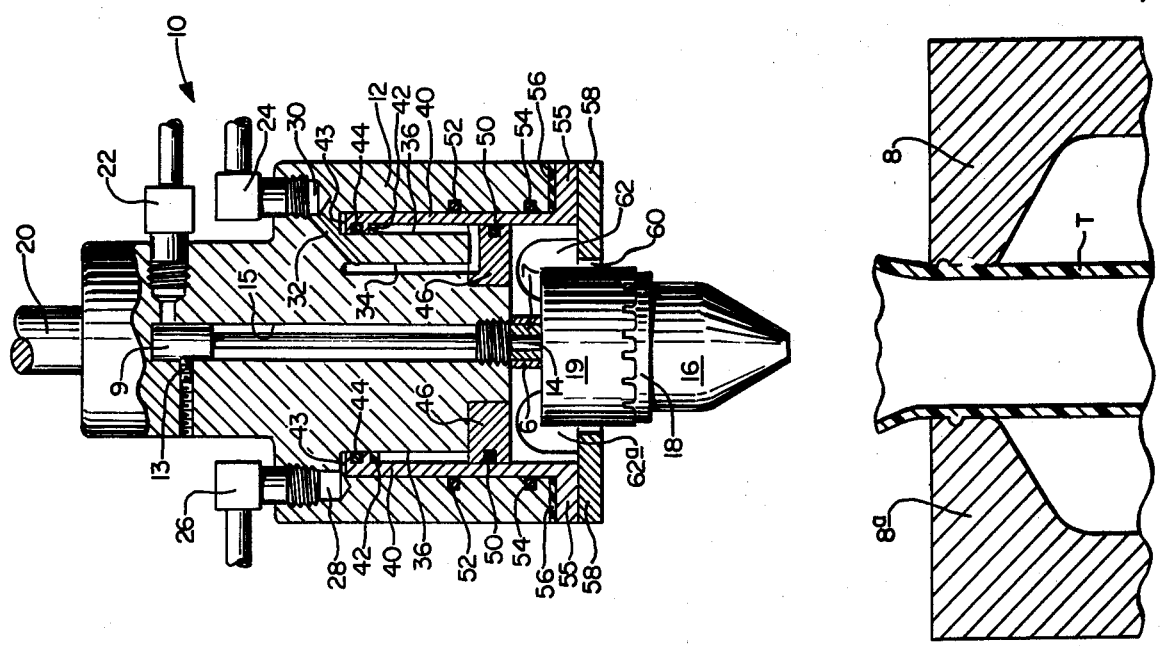

In operation, the cycle begins when apparatus 10 is in the up position, as shown in FIG. 1 with blow pin 16 being positioned above tube "T." In FIG. 2 the blow pin cylinder is activated causing rod 20 to move downward thereby positioning apparatus 10 in the blow position with blow pin 16 being inserted into tube "T." As blow pin 16 is lowered, cutting collar 18 makes contact with moil "M" as is shown in FIG. 6 and co-acts with anvil 70 to at least partially sever the moil. Rotation collar 19 also engages the moil to obtain a grip thereon. Blow air is passed through blow pin 16 into tube "T" to form bottle "B".

In FIG. 3, annular piston 40 has been lowered so that cooling plate 58 has contacted moil "M" and flattened it into a doughnut-like shape against the cool mold. The moil is kept in this position to assure that it is cooled to a sufficient extent. Lowering of annular piston 40 is accomplished by feeding compressed air into annular cylinder 36 through chamber 28 to a point above piston head 43. Any compressed air present below piston head 43 is vented to allow downward movement of piston 40.

After the bottle is blown and cooled in the mold, collar 19 is rotated along with apparatus 10 to shear cooled moil "M" from bottle "B." The blow pin cylinder then retracts rod 20 thereby raising apparatus 10 away from the blow mold, as shown in FIG. 4. At the same time piston 40 is also raised by the application of compressed air to piston 36 at a point below piston head 43. This air passed through compressed air fitting 24 and the compressed air conduit made up of horizontal bore 48, vertical bore 34 and feeder bore 32. The compressed air in cylinder 36 above piston head 43 is released out through compressed air fitting 26 by venting through a conventional, openable vent (not shown) in the compressed air feed line which is attached to fitting 26. Note that the flattened, cooled, moil "M" is still attached to rotation collar 19 and has been removed from bottle "B".

Figure 5:
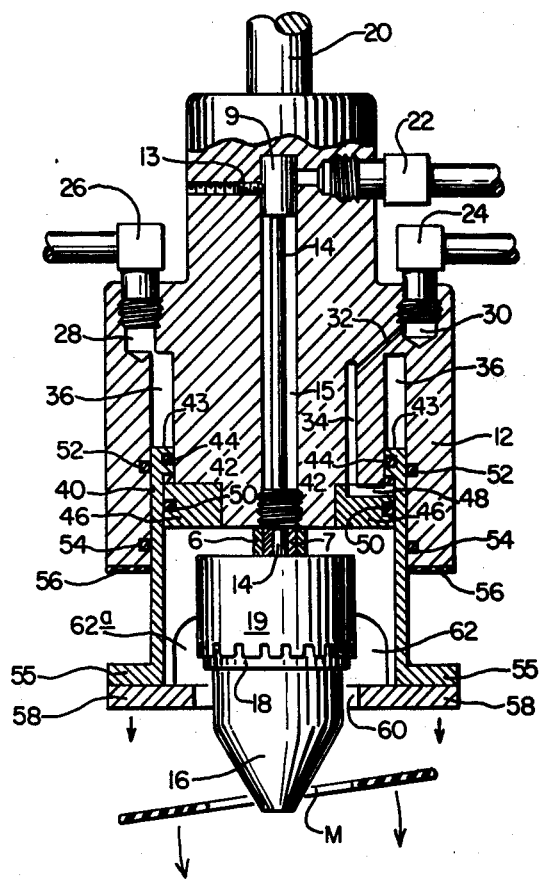

In FIG. 5 the flattened, cooled moil "M" is removed from rotation collar 19 by causing annular piston 40 to extend to its downwardmost position thereby knocking cooled, flattened moil "M" from blow pin 16. Annular piston 40 is then returned to the up position.

From the foregoing description it is apparent this invention provides an unusually simple and economical apparatus for cleanly removing the neck moil from a container without danger of the neck moil staying attached and deforming the container. The cooling plate provides cooling for the neck moil by the simple expediency of pressing it against the surface of the blow mold. The result is a clean break between moil and bottle. Not only is the neck moil cooled, but also it is flattened into a convenient flat doughnut-like form which may be easily removed from the rotation collar.

It will, of course, be understood that various details of construction may be modified through a wide range without departing from the principles of this invention and it is therefore not the purpose to limit the patent granted hereon otherwise than necessitated by the scope of the appended claims.

What is claimed is:

1. An apparatus for cooling the neck moil of a container while it is in a blow mold, said apparatus comprising:
   a. a body portion, said body portion having a first connecting means for connecting said body portion to the rod of a blow pin cylinder and a second connecting means for connecting a blow pin stem to said body portion, said blow pin stem carrying a blow pin, a cutting collar and a rotation collar;
   b. a blow air channel in said body portion for providing pressurized gas to said blow pin;
   c. an annular cylinder in said body portion;
   d. an annular piston fittable within said annular cylinder, said piston having attached thereto a cooling plate for pressing said moil onto said blow mold;
   e. a first inlet means communicative with said annular cylinder for supplying pressurized gas to said annular cylinder to move said piston towards said moil; and
   f. a second inlet means communicative with said annular cylinder for supplying pressurized gas to said annular cylinder to move said piston away from said moil.

2. The apparatus of claim 1 wherein said air channel is axially aligned with the vertical axis of said blow pin.

3. The apparatus of claim 2 wherein said annular cylinder is coaxial with said air channel.

4. The apparatus of claim 2 wherein said air channel is a tube extending the length of a vertical bore in said cylindrical body portion and is attached at one of its ends to said body portion and at the other of its ends to said blow pin.

5. The apparatus of claim 1 wherein said second connecting means comprises a threaded portion of said body portion for receiving a blow pin stem, said blow pin stem being threaded on both of its ends, one of the ends being threadable to said threaded portion and the other of its ends being threadable to said blow pin.

6. The apparatus of claim 1 wherein said annular piston has at its uppermost end a piston head which comprises an annular inwardly turned lip.

7. The apparatus of claim 1 wherein said apparatus is rotated by rotation means so that said rotatable collar places a torque on said moil to effect breaking of said moil from said container.

8. The apparatus of claim 1 wherein said annular cylinder and said annular piston have their axes congruent with the vertical axis of said blow pin.

* * * * *